United States Patent
Gibson et al.

(10) Patent No.: US 7,895,570 B2
(45) Date of Patent: Feb. 22, 2011

(54) ACCESSIBLE ROLE AND STATE INFORMATION IN HTML DOCUMENTS

(75) Inventors: Becky J. Gibson, Westford, MA (US); Daniel A. Gisolfi, Hopewell, NY (US); Laurent Hasson, New York, NY (US); Aaron M. Leventhal, Arlington, MA (US); Mark A. Pilgrim, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1461 days.

(21) Appl. No.: 11/315,955

(22) Filed: Dec. 22, 2005

(65) Prior Publication Data
US 2007/0157077 A1    Jul. 5, 2007

(51) Int. Cl.
*G06F 9/44* (2006.01)
(52) U.S. Cl. .................. 717/115; 719/320; 715/234
(58) Field of Classification Search .................. 717/115, 717/139
See application file for complete search history.

(56) References Cited

U.S. PATENT DOCUMENTS

| | | | | |
|---|---|---|---|---|
| 5,875,296 | A * | 2/1999 | Shi et al. ...................... 726/5 |
| 5,983,190 | A * | 11/1999 | Trower, II et al. ........... 704/276 |
| 5,983,234 | A * | 11/1999 | Tietjen et al. ........... 707/103 R |
| 6,023,714 | A * | 2/2000 | Hill et al. ................... 715/235 |
| 6,122,661 | A * | 9/2000 | Stedman et al. ............. 709/217 |
| 6,305,012 | B1 * | 10/2001 | Beadle et al. ............... 717/148 |
| 6,347,323 | B1 * | 2/2002 | Garber et al. ...................... 1/1 |
| 6,367,013 | B1 * | 4/2002 | Bisbee et al. ............... 713/178 |
| 6,473,893 | B1 * | 10/2002 | Kay et al. .................... 717/116 |
| 6,651,108 | B2 * | 11/2003 | Popp et al. ................... 719/315 |
| 6,678,738 | B2 * | 1/2004 | Haverstock et al. ......... 709/246 |
| 6,697,849 | B1 * | 2/2004 | Carlson ....................... 709/219 |
| 6,873,877 | B1 * | 3/2005 | Tobias et al. ................... 700/94 |
| 6,986,102 | B1 * | 1/2006 | Baer et al. ................... 715/206 |
| 7,340,481 | B1 * | 3/2008 | Baer et al. ................ 707/104.1 |
| 2002/0049749 | A1 * | 4/2002 | Helgeson et al. ............... 707/3 |
| 2002/0089526 | A1 * | 7/2002 | Buxton et al. ............... 345/700 |
| 2002/0147801 | A1 * | 10/2002 | Gullotta et al. ............. 709/223 |

(Continued)

OTHER PUBLICATIONS

Mark Pilgrim, Aaron Leventhal, and Becky Gibson, "Embedding Accessibility Role and State Metadata in HTML Documents" Dec. 2006, W3C <http://www.w3.org/WAI/PF/adaptable/HTML4/embedding-20061212.html> all pages.*

Dave Raggett Arnaud Le Hors, and Ian Jacobs, "HTML 4.01 Specification" Dec. 24, 1999, W3C <http://www.w3.org/TR/html4/html40.txt> pp. 1-56, 200-210.*

(Continued)

*Primary Examiner*—Tuan Q Dam
*Assistant Examiner*—Samuel Hayim
(74) *Attorney, Agent, or Firm*—Stevens & Showalter LLP

(57) ABSTRACT

Accessible role and state information may be included in hypertext markup language documents by encoding an accessibility definition into a class attribute. The accessibility definition corresponds with an object of a hypertext markup language document and comprises role information and state information if state information is applicable to the corresponding role information. A script is associated with the hypertext markup language document and is configured for parsing at least a portion of the hypertext markup language document to identify the accessibility definition. The script further maps the role information and the state information in the accessibility definition to corresponding namespaced role and state attributes.

20 Claims, 6 Drawing Sheets

U.S. PATENT DOCUMENTS

| | | | |
|---|---|---|---|
| 2002/0165988 A1* | 11/2002 | Khan et al. | 709/246 |
| 2003/0037076 A1* | 2/2003 | Bravery et al. | 707/517 |
| 2003/0101203 A1* | 5/2003 | Chen et al. | 707/513 |
| 2004/0034831 A1* | 2/2004 | Grober et al. | 715/507 |
| 2004/0098306 A1* | 5/2004 | Fitzpatrick et al. | 705/14 |
| 2004/0111727 A1* | 6/2004 | Schwarzbauer et al. | 719/310 |
| 2004/0230900 A1* | 11/2004 | Relyea et al. | 715/513 |
| 2005/0022116 A1* | 1/2005 | Bowman et al. | 715/513 |
| 2005/0060646 A1* | 3/2005 | Gauthier et al. | 715/513 |
| 2005/0081142 A1* | 4/2005 | Popp et al. | 715/513 |
| 2005/0268222 A1* | 12/2005 | Cheng | 715/513 |
| 2005/0278726 A1* | 12/2005 | Cano et al. | 719/315 |
| 2007/0157077 A1* | 7/2007 | Gibson et al. | 715/513 |

OTHER PUBLICATIONS

Peter-Paul Koch "The Document Object Model: an Introduction" May 14, 2001, Digital Web Magazine <http://www.digitalweb.com/articles/the_document_object_model/> pp. 1-9.*

Wium Lie and Bert Bos "Cascading Style Sheets, level 1" Jan. 11, 1999 W3C <http://www.w3.org/TR/1999/REC-CSS1-19990111> pp. 1-10.*

Johnny Stenback, Philipe Le Hegaret, and Arnad Le Hors, "Document Object Model HTML" Jan. 9, 2003, W3C <http://www.w3.org/TR/2003/REC-DOM-Level-2-HTML-20030109/html.html> pp. 1-10.*

* cited by examiner

ACCESSIBLE ROLE AND STATE INFORMATION IN HTML DOCUMENTS

BACKGROUND OF THE INVENTION

The present invention relates in general to hypertext markup language documents, and more particularly, to systems and methods for including accessible metadata, such as role and state information, in conventional hypertext markup language documents.

Hypertext Markup Language (HTML) is derived from a subset of the Standard Generalized Mark-Up Language (SGML) and defines the authoring language used to create HTML documents. A web-browsing software program executed on a computing device allows a computer user to access and interact with HTML documents over the World Wide Web. To promote a more interactive experience, HTML documents may include dynamic objects such as drop-down menus, tree views, checkboxes, and other graphical user interface components, which are designated by role information and optionally state information.

Role information is typically predefined and characterizes the function of a particular object. For example, a role may comprise a checkbox, a menu, a button, a window frame, or other desktop component. State information is associated with a given role and defines a current condition of that role. For example, a dynamic object implementing the role of a checkbox may have an associated state of checked or unchecked; an object implementing the role of a menu may have a state of expanded or collapsed, visible or hidden, etc. Thus, the set of valid states from which a given state may be specified for an associated object often depends on the corresponding role.

Some objects, such as checkboxes, are directly supported by the HTML specification. However, many desirable objects such as menus that dynamically change in response to user interaction are not directly supported in native HTML. In cases where desired objects are not supported directly in HTML, developers of web-based applications often define unique objects by utilizing HTML elements and by programming the desired behavior of such objects in a client-side scripting language.

BRIEF SUMMARY OF THE INVENTION

According to one aspect of the present invention, accessible role and state information may be included in hypertext markup language documents by encoding an accessibility definition into a class attribute. The accessibility definition corresponds with an object of a hypertext markup language document and comprises role information and state information if state information is applicable to the corresponding role information. A script is associated with the hypertext markup language document and is configured for parsing at least a portion of the hypertext markup language document to identify the accessibility definition. The script further maps the role information and the state information in the accessibility definition to corresponding namespaced role and state attributes.

The accessibility definition may be encoded into a class attribute so as to define an accessibility data structure. The accessibility data structure comprises an accessibility header, the role information, and the state information, if applicable to the corresponding role information. The accessibility header uniquely identifies its associated class attribute as containing the accessibility data structure. The role information corresponds to a role or function of the associated object of the document and state information, where provided, corresponds to the current status of the associated role information.

The class attribute may further contain class information that is non-related to the accessibility definition. For example, any number of non-related classes may precede the accessibility header. Moreover, the accessibility definition may be encoded via the class attribute into a semantically meaningless hypertext markup language element, such as <span> or <div>.

The script may be configured to perform the parsing operation on the loading of the hypertext markup language document and/or the script may be configured to perform the parsing operation each time a new element is added subsequent to the loading of the hypertext markup language document. Moreover, the script may map the role and state information into extended hypertext markup language namespaced attributes.

According to yet another aspect of the present invention, a computer program product for including accessible role and state information in hypertext markup language documents comprises a computer usable medium having computer usable program code embodied therein. The computer usable medium comprises computer usable program code configured to encode an accessibility definition into a class attribute that comprises role information and corresponding state information if applicable, where the accessibility definition is associated with an object of a hypertext markup language document. The hypertext markup language document is associated with a script configured for parsing at least a portion of the hypertext markup language document to identify the accessibility definition, and for mapping the role information and the state information of the accessibility definition to corresponding namespaced role and state attributes.

The script may comprise, for example, computer usable program code configured as a library of functions that can be called from the hypertext markup language document. The script may further comprise computer usable program code configured as a library of functions that can be called to parse a single element or any part of the document, including the entire document. In this regard, the script may be included directly with the document, or included as a separate file.

BRIEF DESCRIPTION OF THE SEVERAL VIEWS OF THE DRAWINGS

The following detailed description of the preferred embodiments of various embodiments of the present invention can be best understood when read in conjunction with the following drawings, where like structure is indicated with like reference numerals, and in which.

DETAILED DESCRIPTION OF THE INVENTION

Figure 1:
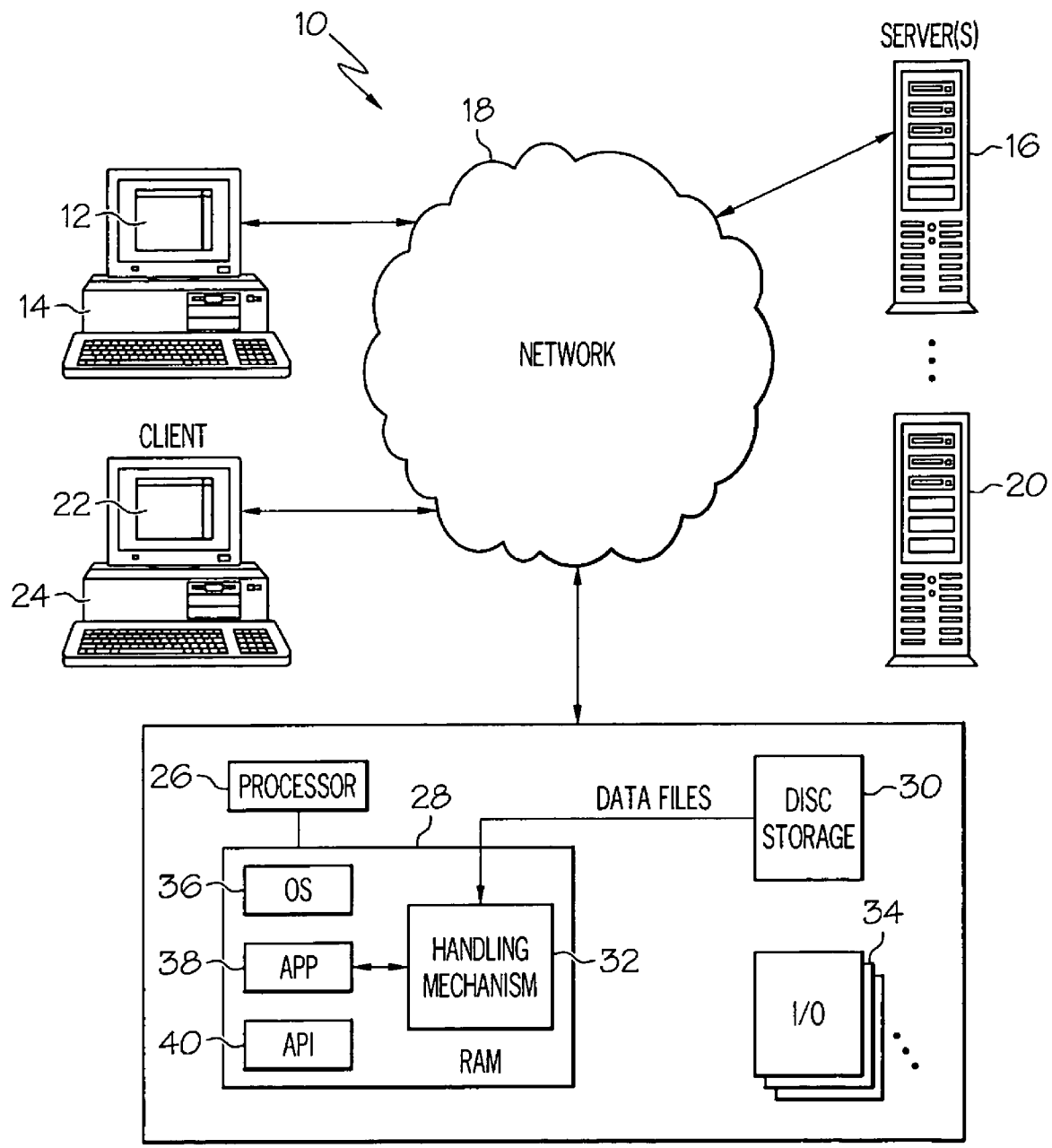
FIG. 1 is a simplified block diagram of a typical computer environment over which various aspects of the present invention may be practiced.

In the following detailed description of the illustrated embodiments, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of various embodiments of the present invention.

As will be appreciated by one of skill in the art, the various aspects of the present invention may be embodied as a method, system, or computer program product. Moreover, the various aspects of the present invention may take the form of an entirely hardware embodiment, an entirely software embodiment or an embodiment combining software and hardware aspects. Furthermore, the present invention may take the form of a computer program product on a computer-usable storage medium having computer-usable program code embodied in the medium.

The software aspects of the present invention may be stored on any suitable computer usable or computer readable medium, including but not limited to, any medium that can contain, store, communicate, or transport the program for use by or in connection with an instruction execution system of a corresponding processing device. The computer readable medium may comprise, for example, an electronic, magnetic, optical, electromagnetic, infrared, or semiconductor system, apparatus or device. More specific examples of the computer-readable medium include an electrical connection having one or more wires, a portable computer diskette, a magnetic storage device, a hard disk, a random access memory (RAM), a read-only memory (ROM), an erasable programmable read-only memory (EPROM or Flash memory), an optical fiber, a portable compact disc (CD ROM), digital video disk (DVD) or an optical storage device.

Computer program code for carrying out operations of various aspects of the present invention is typically written in a scripting language, such as ECMAScript. However, portions of the code may also be written in an object oriented programming language such as Java, Smalltalk, C++, or in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN) or other network connection. For example, the connection may be made to an external computer, such as through the Internet using an Internet Service Provider.

The various aspects of the present invention are described herein with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to the drawings, and particularly to FIG. 1, a representative computer system 10 is illustrated in which Hypertext Markup Language (HTML) documents, also referred to herein as web pages, may be created and accessed using a subset of the conventional Internet paradigm, known as the World Wide Web. An HTML authoring entity such as a person, group of persons, software agent or other source creates an HTML document 12, e.g., using suitable document authoring software running on a first computer 14. The content of the HTML document 12 is then transmitted to a server computer 16 via a network 18. The network 18 may comprise for example, the Internet including the World Wide Web, an Intranet, an Extranet or any other suitable communications path. The computer system 10 will typically include other servers 20 for domain name resolution, routing and other control functions.

Once hosted on the server computer 16, the HTML document 12 may be accessed by a user agent. User agents may include for example, web-browsers such as graphical and/or text based computer applications or non-visual browsers such as audio, Braille and other assistive technology devices. User agents may also include search robots, proxies, etc., thus a user need not directly interact with a corresponding user agent. The user agent typically renders the HTML document 12 into a presentable document 22, which is interpreted, converted or otherwise formatted such that a user or operator may view, hear, or otherwise interact with the rendered HTML document, such as on a client computer 24.

A representative client computer 24 may comprise a personal computer (PC), notebook computer, appliance or pervasive computing device, such as a personal data assistant (PDA), palm computer, cellular access processing device or other suitable device capable of communicating with other devices on the computer system 10. The client computer 24 typically includes an operating system and one or more Internet tools, including a user-agent such as a web-browser, for retrieving and processing HTML documents 12. Communications between the client computer 24 and the server computer 16 typically conform to the Hypertext Transfer Protocol (HTTP), and such communications may be made over a secure or an un-secure connection.

Each of the computing devices that communicate across the network 18, e.g., the first computer 14, the server 16, 20 and the client computer 24, typically include at least one processor 26 for executing software code, system memory 28, such as random access memory (RAM) for storing software code that is being executed by the processor 26 and disk or other permanent storage 30 for storing files of information including software applications, data files etc. A handling mechanism 32 is typically provided to facilitate communication between the system memory 28 and the permanent storage 30. A plurality of input output devices (I/O) devices 34 are also typically provided to allow external devices to communicate with the processor 26. For example, an I/O device such as a network interface includes hardware and/or software for interacting with the computer and for communicating across the network 18.

The typical computing device further includes suitable software including an operating system 36 and one or more applications 38, which are typically stored in the permanent storage 30 and are temporarily copied into the system memory 28 for execution. The representative computer may also include an application programming interface (API) 40. For example, an API 40 may provide extensions that enable application developers to extend and/or customize the core functionality of HTML documents through software programs including plug-ins, and scripts.

Figure 2:
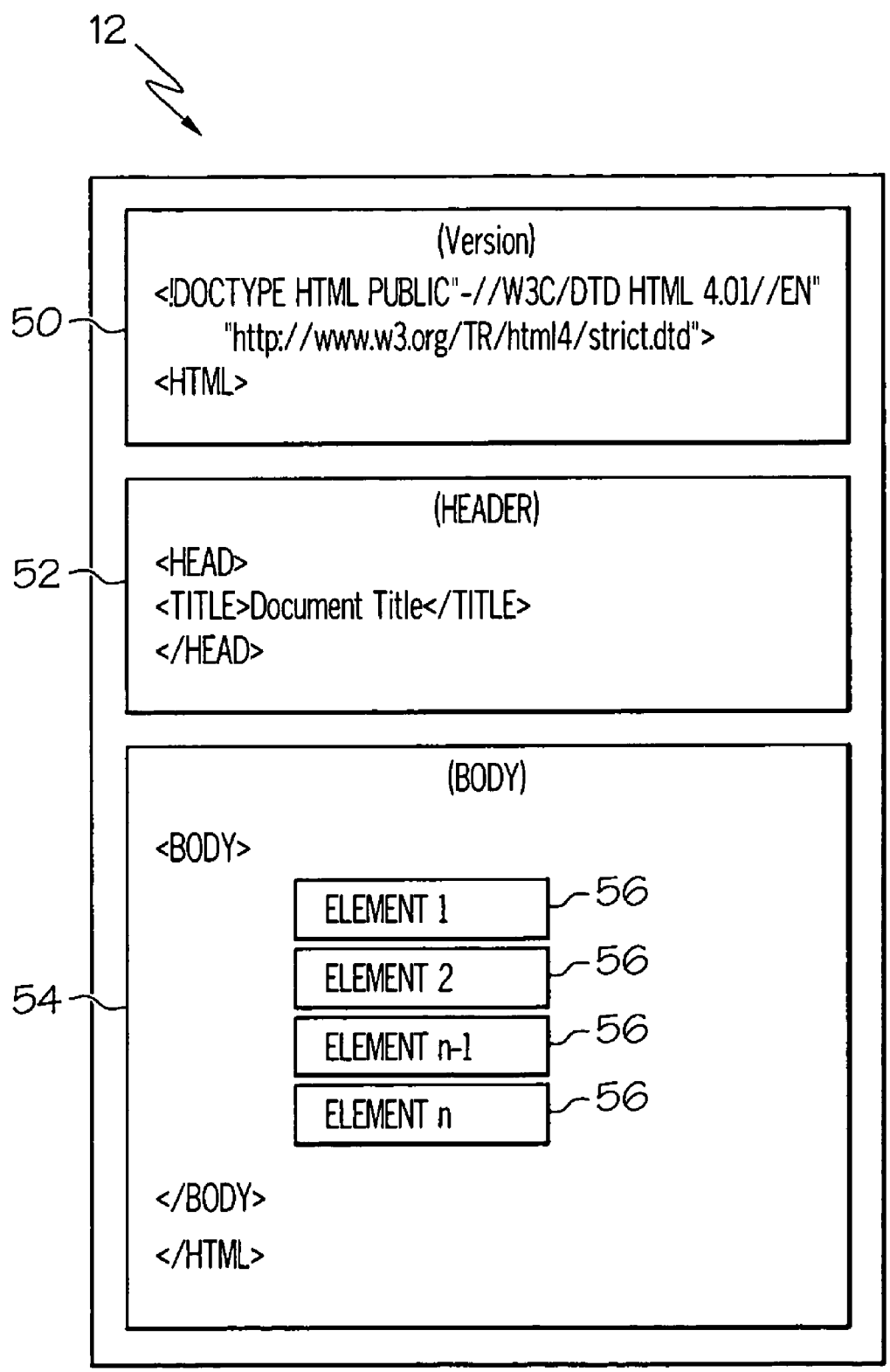
FIG. 2 is a block diagram illustrating select components of a typical hypertext markup language document.

With reference to FIGS. 1 and 2, in general terms, an HTML document, such as the HTML document 12 illustrated in FIG. 1, comprises three general components, including an HTML version component 50, a header component 52 and a body component 54. The HTML version component 50 declares the version of the HTML code written in the document 12. The header component 52 is a declarative section that contains information about the document 12, and may include data such as the document title, keywords that may be useful to search engines, and other data that is not considered document content. The body component 54 contains the HTML document content, which is typically rendered into a formatted visual and/or audible file that is presented to a user accessing the HTML file. For example, the body component 54 may be rendered into the presentable document 22 using a user agent such as a web-browser on the client computer 24 as described more fully herein.

As illustrated, the document 12 comprises a plurality of elements 56 (a total of n elements as shown) that describe parts of the HTML document 12. Each element 56 may include one or more attributes, which identify or describe the characteristics of the corresponding element. For example, an "ID" attribute may be used to assign a name to an element 56, which must be unique in the HTML document 12.

Figure 3:
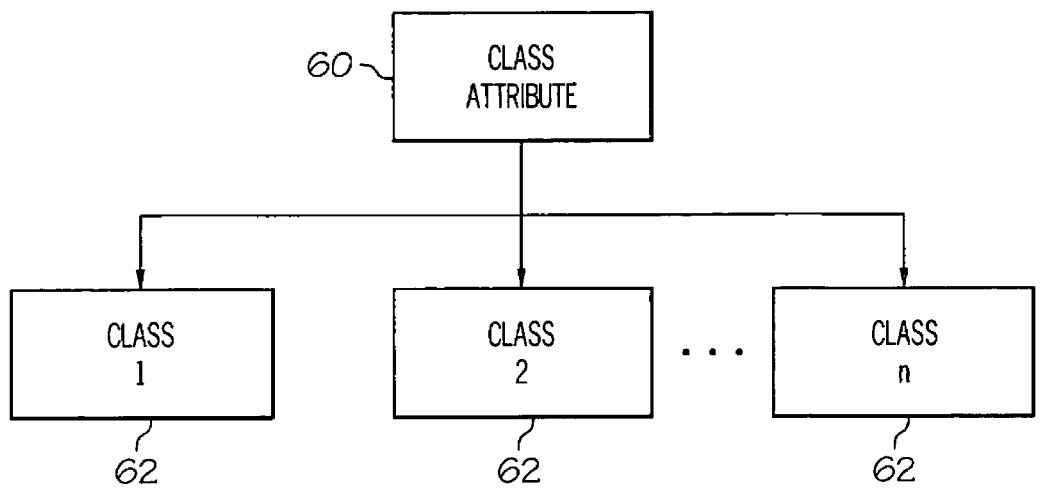
FIG. 3 is a block diagram illustrating a general framework for using the HTML class attribute.

With reference to FIG. 3, another attribute that may be used to characterize an element 56 is the class attribute 60. The class attribute is utilized by an HTML document developer to specify that an element 56 of the HTML document 12 is a member of a class. In practice, a given element 56 of the HTML document may be a member of more than one class, and any number of elements 56 can share the same class. In conventional HTML, the class attribute is represented by a space separated list of class names 62.

Figure 4:
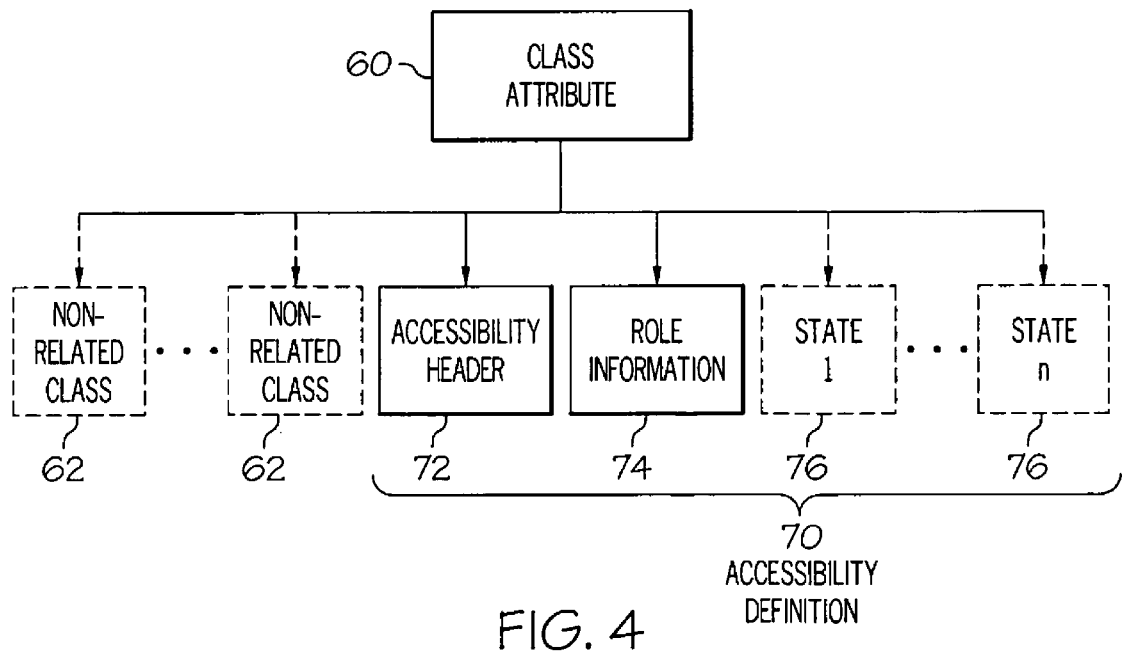
FIG. 4 is a block diagram illustrating an exemplary use of the class attribute to encode role and state information.

With reference to FIG. 4, an HTML class attribute 60 may be utilized to contain an accessibility definition 70. The accessibility definition 70 is utilized to assign role and state data to objects of the HTML document 12. In the example illustrated, the accessibility definition 70 comprises an accessibility header 72, role information 74 and optionally, state information 76, which generally corresponds to the particular role information. The state information 76 is shown in phantom lines in FIG. 4 to represent that there may or not be state information associated with a given accessibility definition 70, depending for example, upon the particular role information as described in greater detail herein. Thus, in the illustrated example, the accessibility definition 70 may be characterized as a data structure for organizing role and state data. Using conventional HTML class attribute syntax, a first one of the classes of the accessibility definition 70 comprises the accessibility header 72, a second one of the classes of the accessibility definition 70 comprises the role information 74 and the state information 76, if applicable, is encoded into subsequent ones of the classes of the accessibility definition 70. The accessibility header 72, the role information 74 and state information 76 are each separated by a white space.

Dynamic hypertext markup language (DHTML) controls or objects, which are not natively supported in HTML, may be readily created and utilized in HTML platforms by associating scripted event handlers and varied presentations with semantically meaningless HTML elements 56, such as <div> or <span>. These DHTML controls can have relevant accessibility definitions 70 associated with them via the class attribute. For example, the simplified HTML syntax for associated accessibility information with a DHTML control may be expressed generally as:

```
<body>
<span class="nonrelated_classes accessibility_header role_information state_information">
</span>
```

The accessibility header 72 defines a control sequence that identifies the particular class attribute as the accessibility definition 70. The accessibility header 72 should be unique to the existing class attributes 60 in the HTML document 12. However, the same accessibility header 72 is utilized repeated times within an HTML document 12 to indicate an occurrence of a new accessibility definition 70. In one exemplary implementation, the accessibility header 72 was chosen to comprise the word "accessible". Thus, from a conceptual standpoint, each accessibility definition 70, and thus each corresponding DHTML control or object, may be thought of as a class of type "accessible".

The role information 74 defines the role of the DHTML object, such as an alert, button, checkbox, column header, list item, menu bar or menu item, etc. The state information 76 defines the current status, i.e., the state of the corresponding DHTML object. For example, an HTML object defined by a role of a checkbox may have a state of checked=true or checked=false; an HTML object defined by a role of a list item may have a state of selected, read only, etc. In one exemplary implementation, each accessibility definition 70 is formatted to include a single accessibility header 72, e.g., the key word "accessible", one occurrence of role information 74 and zero or more occurrences of state information 76. Other definition formats may alternatively be provided, depending upon the needs of the particular implementation.

Each occurrence of state information 76 may comprise a key-value pair, e.g., separated by a hyphen. For example, to represent that a checkbox control is currently checked, an exemplary HTML syntax may recite:

```
<body>
    <span class="accessible checkbox checked-true">
    </span>
```

Further, a true Boolean state may alternatively be represented by the state name without the hyphen and designating Boolean state, e.g.,

```
<body>
    <span class="accessible checkbox checked">
    </span>
```

The class attribute 60 may further contain classes that are non-related to the accessibility definition, as represented by the classes 62 illustrated in phantom lines. For example, a web developer may create some specific cascading style sheets (CSS) styles for an object that is to be accessible. If the span element <span> is utilized to represent a tree item in a tree widget, a CSS style may be called "elegantTreeItem." Thus, the corresponding span class may become:

```
<span class="elegantTreeItem accessible treeitem">
``` where the actual CSS class name appears before the accessibility header.

In the above illustrative example of an accessibility definition 70, the accessibility header 72 is treated conceptually, as a marker to show where accessibility information begins within the class attribute. Thus, there may be classes within the class attribute that are before the accessibility header that may be used for anything else. However, the classes in a class attribute, including the role and state information, may be characterized in any order so long as rules can be devised to extract the role and state information out of the space delimited list of classes. Accordingly the accessibility header 72 may not be required in certain implementations.

Since the class attribute of HTML has been utilized to define a data structure, the user agent may be required to understand how to interpret the data structure of the accessibility definition 70. As an alternative, a client-side scripting library may be further provided, e.g., either with the HTML document 12 or otherwise accessible to a user agent when processing the HTML document 12, to define the role and state information 74, 76 written into the accessibility definition 70. For example, script routines may be constructed using the ECMAScript library. Using scripts, the user agent need not comprehend the new data structure of the accessibility definition 70 as the script can be used to perform the necessary manipulation, an example of which is set out in greater detail below.

XML-based markup languages such as the Extended Hypertext Markup Language (XHTML) provide a way for web-based applications to define the accessible role and state metadata directly in a web-based document. However, the XHTML specification requires the declaration and use of namespaces to denote accessible role and state metadata. An XHTML namespace is a collection of names, identified by a Uniform Resource Identifier (URI), which are used as element types and attribute names. However, HTML documents do not support namespaces, so the required accessibility role and state metadata can not be included directly in native HTML documents. In particular, due to the nature of HTML, including the manner in which web-browsers parse HTML documents, HTML cannot support multiple namespaces. A typical web-browser constructs a document object model (DOM), i.e., a tree that contains representations of elements and attributes and renders the document from the document object model. The data structures used in the rendering process are standardized across all web-browsers. Thus, all HTML elements are written to memory in a common, default namespace.

However, once a web browser has constructed the document object model, that model does support multiple namespaces. Accordingly, after the document has been parsed by the web-browser, i.e., after the document has been loaded into memory, e.g., on the client computer 24, a script may be utilized to copy the role and state information from the accessibility definition(s) into the appropriate namespaced role and state attributes.

In XHTML and other XML-based markup language specifications, a modularized approach allows the web-browser to group core elements and attributes in a default namespace, and to allocate other elements and attributes to additional namespaces, such as for role information and for state information. The web-browser then takes all of the namespaces and constructs a unified object model to render the document.

According to one exemplary aspect of the present invention, role information and state information that has been encoded into the accessibility definition 70 is mapped to namespaced role and state attributes using conventional HTML and a suitable script. A suitable client-side scripting language, such as Javascript, is used to attach this information to each element via namespaced role and state attributes, in browsers that support namespaces. According to one aspect of the present invention, the accessibility definition 70 is mapped to the namespaced role and state formats, which can be processed and understood by compatible web-browsers and assistive technologies. This approach provides the HTML document author with the capability to encode role and state information in legacy HTML documents, and to utilize the flexibility of the role and state definitions, and the already built-in support for those definitions by the web-browser. Moreover, this approach will work with any web-browser that adopts support for XHTML, and will be ignored by web-browsers that do not support XHTML.

Accordingly, the developer can take full advantage of namespaced role and state information without having to conform the HTML code written in the HTML document 12 to the XHTML format. Rather, conventional and well supported HTML can continue to be used.

Graphics-based computer operating systems upon which web-browsers are executed, typically provide accessibility application programming interfaces (APIs) to facilitate interoperability with assistive technologies such as screen readers, screen magnifiers, and voice dictation software, etc. Essentially, these APIs allow a developer to provide information about document content, user interface controls and important events that assistive technologies need to interact with a user. Included in this information is the role and state information of the various objects associated with a given application.

As noted above, the manner in which the accessibility definition 70 is encoded into the HTML document 12, e.g., using an HTML element, results in the code having no adverse effect if XHTML is unsupported by the particular viewing web-browser. However, supporting web-browsers may implement a mapping from the role and state information 74, 76 encoded into the accessibility definition 70 to the corresponding namespaced role and state information, which can then be mapped to the underlying accessibility architecture of the operating system that is executing on the client computer 24. Then assistive technologies can access the information through the same accessibility APIs that they already support for other graphical desktop applications on the graphics-based computer operating system of the client computer 24.

The use of the namespaces is convenient to both the web developer and the web-browser. However, the various aspects of the present invention also allow a developer to define unique namespaces for the role and state information 74, 76, so long as additional support is integrated into the underlying systems to accommodate those unique namespaces.

As one example, the accessibility definition 70 may be used to construct a dynamic checkbox. An exemplary partial pseudo-code section to implement a DHTML checkbox may be written as follows:

```
<html>
<head>
<title>DHTML Checkbox, HTML edition</title>
<script type="text/javascript" src="rolestate.js"></script>
<script type="text/javascript">
<![CDATA[
// Mouse and keyboard event handlers for controls
function checkBoxEvent(event)
{
    if((event.type == "click" && event.button == 0) ||
        (event.type == "keydown" && event.keyCode == 32)) {
        // Toggle checkbox
        var checkbox = event.target;
        if (checkbox.getAttributeNS("
http://www.w3.org/2005/07/aaa", "checked") == "true") {
            checkbox.removeAttributeNS("
http://www.w3.org/2005/07/aaa", "checked");
        }
        else {
            checkbox.setAttributeNS("
http://www.w3.org/2005/07/aaa", "checked", "true");
        }
        return false; // Don't continue propagating event
    }
    return true; // Browser can still use event
};
]]>
</script>
<style type="text/css">
@namespace state url("http://www.w3.org/2005/07/aaa
");
.checkbox:before {
content: url('./unchecked.gif')
}
.checkbox[state|checked="true"]:before {
content: url('./checked.gif')
}
</style>
</head>
<body>
<span class="accessible checkbox checked" id="chbox1" tabindex="0"
onkeydown="return checkBoxEvent(event);" onclick="return
checkBoxEvent(event);">
The checkbox label
</span>
</body>
</html>
```

In general terms, the above pseudo-code defines a checkBoxEvent function that allows mouse and keyboard event handlers to update the status of the checkbox. If the checkbox is accessed and the box is currently checked, the check is toggled OFF. Conversely, if the checkbox is unchecked, the check is toggled ON. As the code suggests, the accessibility definition 70 is defined within the code as follows:

```
<span class="accessible checkbox checked" id="chbox1" tabindex="0"
    onkeydown="return checkBoxEvent(event);" onclick="return
    checkBoxEvent(event);">
</span>
```

The <span> element may contain other attributes in addition to the class attribute containing the accessibility definition 70. For example, as the above exemplary code further illustrates, it is left to the developer to further define the appropriate keyboard event handlers associated with the dynamic object. Moreover, it is left to the developer to provide any desired visual appearance to the checkbox, e.g., using code via CSS, etc.

The above-exemplary code uses a script library that is provided to map the role and state information in the accessibility definition 70 to the appropriate namespaced attributes.

```
<script type="text/javascript" src="rolestate.js"></script>
```

The rolestate.js is an ECMAScript library, which implements a function that parses the role and state information 74, 76 stored in an accessibility definitions 70 that is contained within a corresponding class attribute 60 of the HTML document 12, and copies the relevant data to the correct namespaced attributes. Thus, when assistive technologies want to get information about roles and states of DHTML controls within a legacy HTML document, e.g., a web page or web-based application, that includes an accessibility definition and corresponding script as set out more fully herein, the assistive technologies may only need to support the specification(s) corresponding the namespaced attributes, e.g., XHTML. It is also possible that the web-browser may map the role and state information from both HTML and XHTML to Microsoft Active Accessibility (MSAA), Accessibility Toolkit (ATK) or another desktop accessibility API.

From the assistive technology's point of view, the role and state information stored in legacy HTML documents using the accessibility definition and corresponding script as set out more fully herein, will "look" identical to accessibility information stored directly XHTML documents.

The mapping of the role and state information contained in the accessibility definitions 70 to XHTML namespaced role and state attributes is a convenient exemplary mapping. A developer may alternatively choose to define custom roles through the use of different namespaces. However, additional support may be required by the underlying system. For example, the web-browser should provide support for namespaces for the accessibility information encoded into the native HTML document to be identical to a corresponding specification with another namespace.

Figure 5:
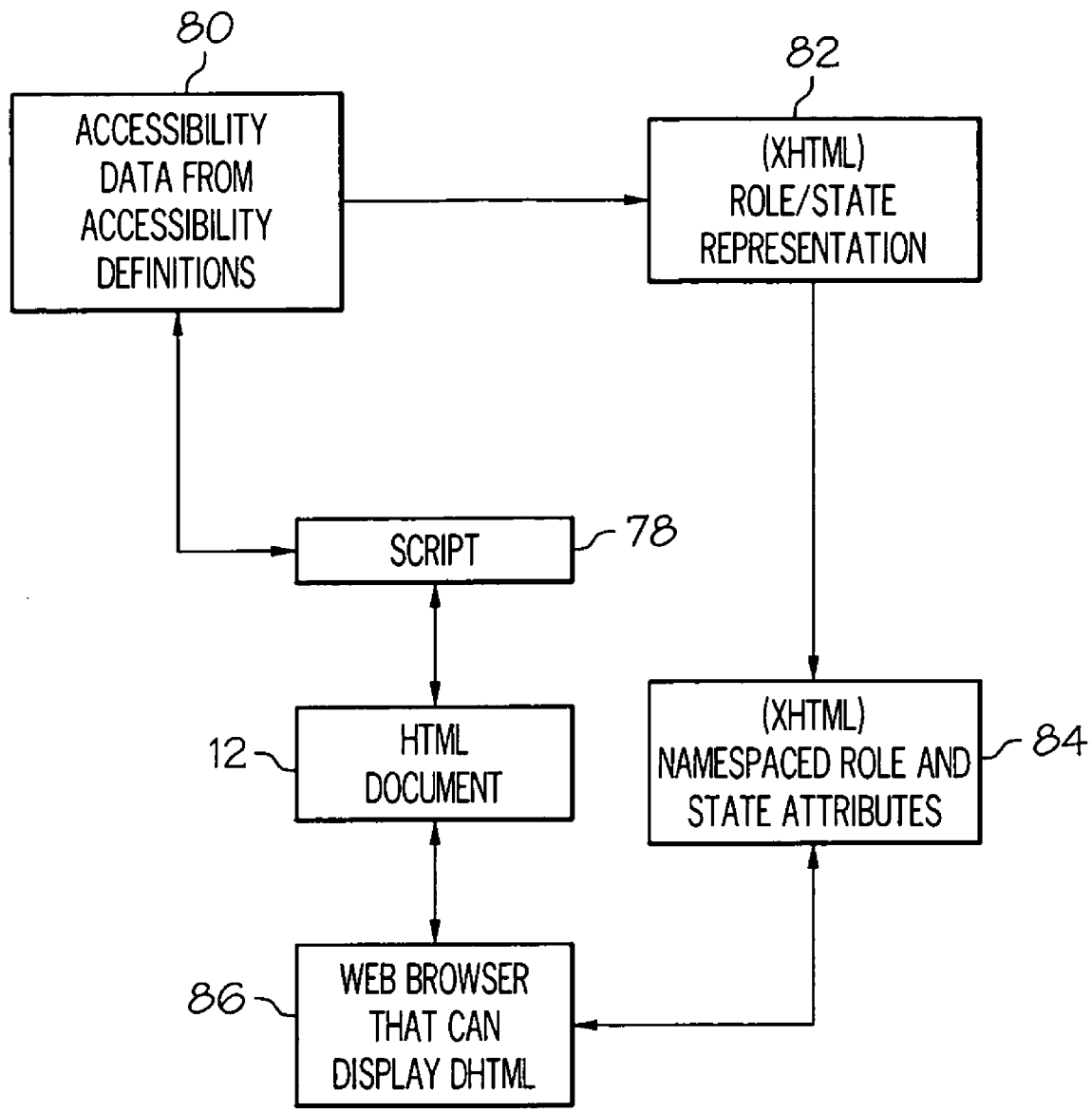
FIG. 5 is a block diagram illustrating an exemplary use of a script to map role and state information to XHTML namespaced role and state attributes.

With reference to FIG. 5, in general terms, at least a portion of the HTML document 12 is parsed by a mapping script 78, which identifies and records the accessibility data 80 corresponding to the role and state information 74, 76 coded into the accessibility definitions 70 within the parsed portions of the HTML document 12. For example, the script 78 may compile a list of the roles and states associated with one or more objects. The mapping script 78 maps the accessibility data 80 to a corresponding XHTML representation 82 and sets the appropriate namespaced role and state attributes 84. That is, a namespaced attribute referred to as "role" has a value that is itself a namespace qualified value. A role namespace contains a set of constants used to enumerate the possible roles. When the script parses the role keyword from the associated class attribute, it maps the role keyword to a corresponding constant defined in the role namespace and then sets an attribute in the XHTML namespace whose value is the namespaced role. For example, given the accessibility definition:

<span class="accessible checkbox">

The mapping script 78 identifies the accessibility definition by the accessibility header "accessible", and extracts the accessibility data, i.e., role=checkbox. The accessibility data is mapped to a corresponding XHTML representation:

<span xhtml2:role="wairole:checkbox">

The <span> is given one new attribute, named xhtml2:role (the "role" attribute in the namespace whose prefix was defined earlier in the document as "xhtml2"). This new attribute has a value of "wairole:checkbox", again where "wairole" is the prefix defined to correspond to the role namespace.

A web-browser 86 suitably equipped to read the namespaced role and state attributes can then display the associated dynamic objects even though the underlying code was written in conventional HTML. A web-browser 86 that is unable to read the namespaced role and state attributes can still interact with the native HTML document. The mapping may also be performed to user-defined namespaces so long as the web-browser can suitably read from those user-defined namespaces.

Accordingly, the script 78 defines a first module for parsing at least a portion of an HTML document 12 to identify occurrences of the accessibility definition 70 and for mapping occurrences of the accessibility definition 70 to corresponding namespaced role and state attributes.

Figure 6:
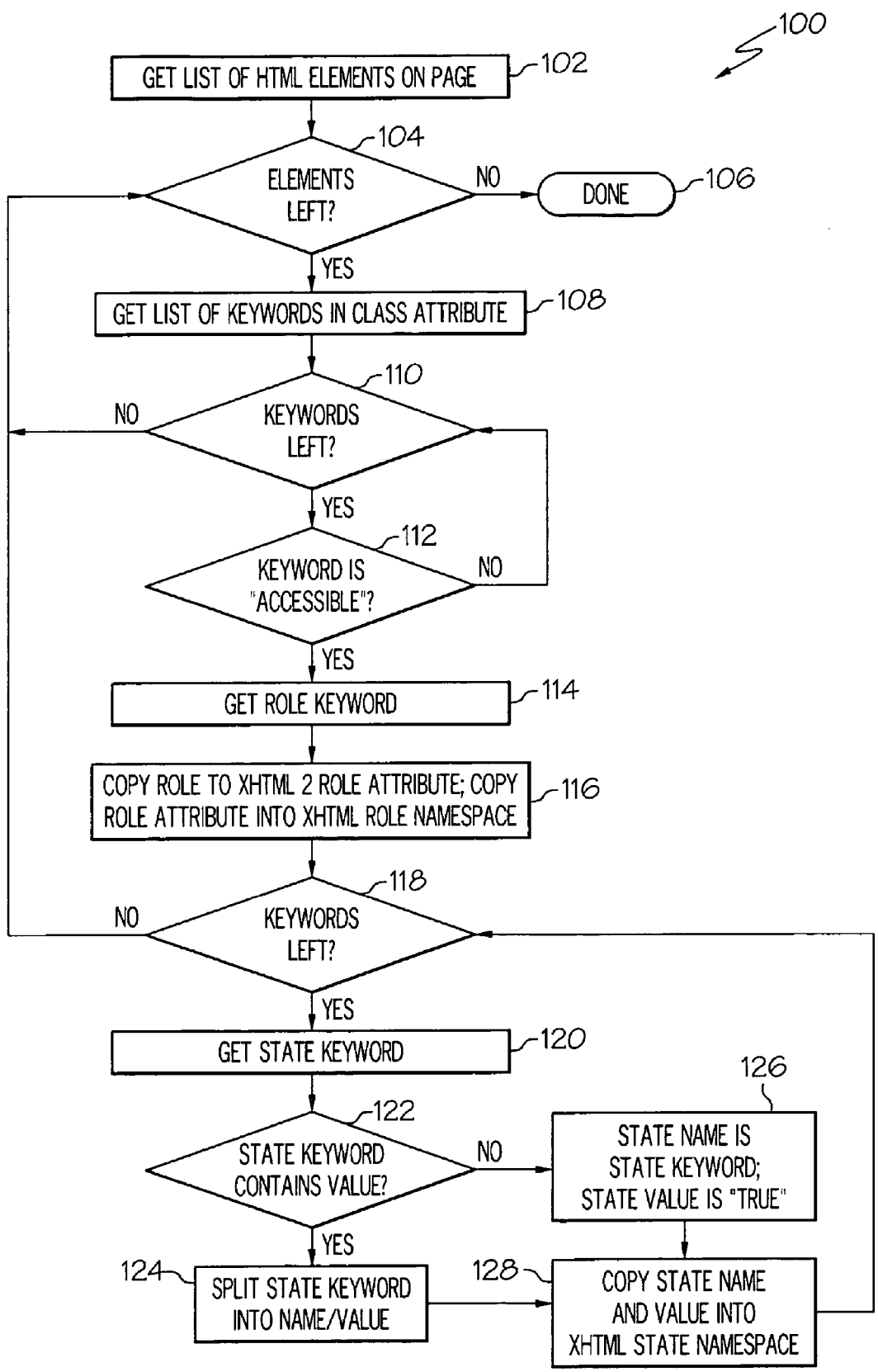
FIG. 6 is a flow chart illustrating an exemplary parsing program for extracting role and state information from HTML code.

With reference to FIG. 6, a more detailed flowchart illustrates one exemplary method 100 of implementing the mapping script 78. The mapping script of the method 100 compiles a first list of HTML elements within the HTML page to be parsed at 102. The first list of HTML elements may comprise, for example, a list of elements, such as <span>, <div> or other elements likely to have class attributes encoded therein. A decision at 104 determines whether all of the elements that were previously compiled in the first list at 102 have been considered. If all of the elements have been considered, then the method is terminated at 106. If there is still at least one element from the first list to be considered, then an element is selected for examination and a class attribute is read from the selected element. A second list is compiled at 108, which comprises a list of keywords in the class attribute of the selected element. A decision at 110 determines whether there are any keywords left in the second list to be considered. If all of the keywords have been considered, the control is returned at 104 to determine if there are any further elements left in the first list of HTML elements that need to be processed.

If a keyword is identified at 110, a decision is made at 112 to determine whether the selected keyword comprises an accessibility header 72. Keeping with the examples used herein, the exemplary method 100 checks for the keyword "accessible", which designates that at least some of the classes listed in the class attribute actually define the data of the accessibility definition 70. As noted in greater detail herein, it is possible to include classes that are non-related to an accessibility definition in a given class attribute. As such, the first class of a class attribute need not be the accessibility header.

If the selected keyword is not the accessibility header 72, e.g., the keyword is not "accessible", the method 100 loops back to the decision box at 110 to consider the next keyword. If the selected keyword is the accessibility header 72, e.g., the selected keyword is "accessible", then the next keyword, which designates the role keyword, e.g., role information 74, is read from the class attribute at 114. The role information is copied to the XHTML role attribute, and the role attribute is copied to the XHTML namespace at 116.

A decision is made at 118 to determine if there are any keywords left in the second list that have not already been considered. If there are no keywords left, then the method 100 loops back to box 104 to determine whether there are any more elements that have not been considered. If there are keywords left in the second list, then those remaining keywords define state information. A state keyword, e.g., state information 76, is read from the second list at 120. A decision at 122 determines whether the state keyword contains a value. If the state keyword does contain a value, then the state keyword is split into a name and a value at 124, e.g., a name of checked and a value of TRUE. If, on the other hand, the state keyword does not contain a value, then the state name is the state keyword, and a default Boolean value is assigned to the state. In the illustrated example, the default Boolean value is TRUE, however, other default state values may alternatively be assigned. The state and value information, whether assigned at 124 or at 126 is copied to the XHTML state namespace at 128 and control is returned to 118.

An exemplary script for parsing at least a portion of an HTML document to extract and process accessibility definitions, e.g., generally in accordance with the method 100 flowcharted in FIG. 6 is as follows:

rolestate.js:

```
function addEvent(elmTarget, sEventName, fCallback) {
    var returnValue = false;
    if (elmTarget.addEventListener) {
        elmTarget.addEventListener(sEventName, fCallback, true);
        returnValue = true;
    }
    else if (elmTarget.attachEvent) {
        returnValue = elmTarget.attachEvent('on' + sEventName, fCallback);
    }
    return returnValue;
}
if (typeof document.documentElement.setAttributeNS != 'undefined') {
```

-continued

```
        function setAttrNS(elmTarget, uriNamespace, sAttrName, sAttrValue) {
            elmTarget.setAttributeNS(UriNamespace, sAttrName, sAttrValue);
        }
        function getAttrNS(elmTarget, uriNamespace, sAttrName) {
            return elmTarget.getAttributeNS(uriNamespace, sAttrName);
        }
        function removeAttrNS(elmTarget, uriNamespace, sAttrName) {
        return elmTarget.removeAttributeNS(uriNamespace,sAttrName);
        }
}
} else {
        function setAttrNS(elmTarget, uriNamespace, sAttrName, sAttrValue) {
            elmTarget.setAttribute(uriNamespace + sAttrName, sAttrValue);
        }
        function getAttrNS(elmTarget, uriNamespace, sAttrName) {
            return elmTarget.getAttribute(UriNamespace + sAttrName);
        }
        function removeAttrNS(elmTarget, uriNamespace, sAttrName) {
        return elmTarget.removeAttribute(uriNamespace + sAttrName);
        }
}
function setRolesAndStates(elmAccessible) {
    var NS_XHTML2 = "http://www.w3.org/TR/xhtml2";
    var NS_STATE = "http://www.w3.org/2005/07/aaa";
    var STATE_MACHINE_BEGIN = 0;
    var STATE_MACHINE_IN_ACCESSIBLE = 1;
    var STATE_MACHINE_ROLE_IS_SET = 2;
    var sClass = elmAccessible.className;
    var arClassNames = sClass.split(' ');
    var machineState = STATE_MACHINE_BEGIN;
    for (j = 0; j < arClassNames.length; j++) {
        var sClass = arClassNames[j].replace(/ /g, '');
        if(!sClass) { continue; }
        if (sClass == 'accessible') {
            /* found "accessible" keyword, rest of class is roles and states */
            machineState = STATE_MACHINE_IN_ACCESSIBLE;
        } else if (machineState == STATE_MACHINE_IN_ACCESSIBLE) {
            /* found role, set it and move on */.
            setAttrNS(elmAccessible, NS_XHTML2, "role", "wairole:" +
            sClass);
            machineState = STATE_MACHINE_ROLE_IS_SET;
        } else if (machineState == STATE_MACHINE_ROLE_IS_SET) {
            /* found state, set it and look for more */
            if(sClass.indexOf('-') != -1) {
                /* state has specific value, parse it out and set it */
                var arValue = sClass.split(/-/);
                /* arValue[0] is state name, arValue[1] is value */
                setAttrNS(elmAccessible, NS_STATE, arValue[0],
                arValue[1]);
            } else {
                /* state is simply a name, value is true */
                setAttrNS(elmAccessible, NS_STATE, sClass, true);
            }
        }
    }
}
function findRolesAndStates(elmRoot) {
    if ((!elmRoot) || (!elmRoot.getElementsByTagName)) {
        elmRoot = document;
    }
    if (document.evaluate) {
        var snapAccessibleElements = document.evaluate(".//*[contains(@class,
'accessible')]", elmRoot, null, XPathResult.UNORDERED_NODE_SNAPSHOT_TYPE,
null);
        for (var i = snapAccessibleElements.snapshotLength - 1; i >= 0; i--) {
            setRolesAndStates(SnapAccessibleElements.snapshotItem(i));
        }
    } else {
    var arElements = (typeof elmRoot.all != 'undefined')? elmRoot.all:
elmRoot.getElementsByTagName('*');
        var iElementCount = arElements.length;
        for (var i = 0; i < iElementCount; i++) {
            if (/accessible /.test(arElements[i].className)) {
                setRolesAndStates(arElements[i]);
            }
        }
    }
}
```

In the exemplary rolestate.js pseudo-code set out above, the provided library does not execute unless otherwise called within the HTML code. In order to activate the rolestate.js code, the findRolesAndStates( ) function should be called with a root element. Upon execution, the findRolesAndStates ( ) function iterates through all the children of the given root element. If no root element is given, the findRolesAnd States( ) function iterates through all elements on the page (i.e. document is the default root element). The findRoles AndStates( ) may be automatically executed on page load, e.g., by adding a suitable command to the library and/or HTML code. For example, an automatic execution may be realized using the above exemplary partial code by adding the line to the end of the library:

addEvent(window, 'load', findRolesAndStates)

However, if a particular web application adds new elements that store role and state information in the class attribute to the page after page load, such new elements may need to call findRolesAndStates as a parameter.

Table 1, which is set out below, illustrates a non-exhaustive list of exemplary dynamic roles that a developer may wish to utilize. The dynamic object role is set out in column 1, labeled DHTML Role. The corresponding expressions in column 2, labeled HTML representation, illustrate exemplary accessibility definition syntax that should be encoded into the HTML document as set out in greater detail herein. The expressions in column 3, labeled XHTML representation, illustrate the XHTML role expression that is mapped to by the rolestate.js library based upon the corresponding accessibility definitions from column 2. The examples in the following table use the <span> element to represent the DHTML control, but any presented HTML element may be used. Moreover, the particular format of the accessibility definitions listed in column 2 is merely illustrative, and any desired format may be used so long as the particular implementation of the script, such as the exemplary rolestate.js script, maps the role and state data encoded in the HTML document to the appropriate namespaced role and state attributes.

TABLE 1

DHTML Roles and corresponding representations

| DHTML Role | HTML representation | XHTML Representation |
|---|---|---|
| alert | <span class="accessible alert"> | <span role="wairole:alert"> |
| | <span class="accessible alert pressed"> | <span role="wairole:alert" state:pressed="true"> |
| | <span class="accessible alert haspopup"> | <span role"wairole:alert" state:haspopup="true"> |
| slider | <span class="accessible slider valuemin-10 valuemax-50 value-30"> | <span role="wairole:slider" state:valuemin="10" state:valuemax="50" >state:value="30"> |

Figure 7:
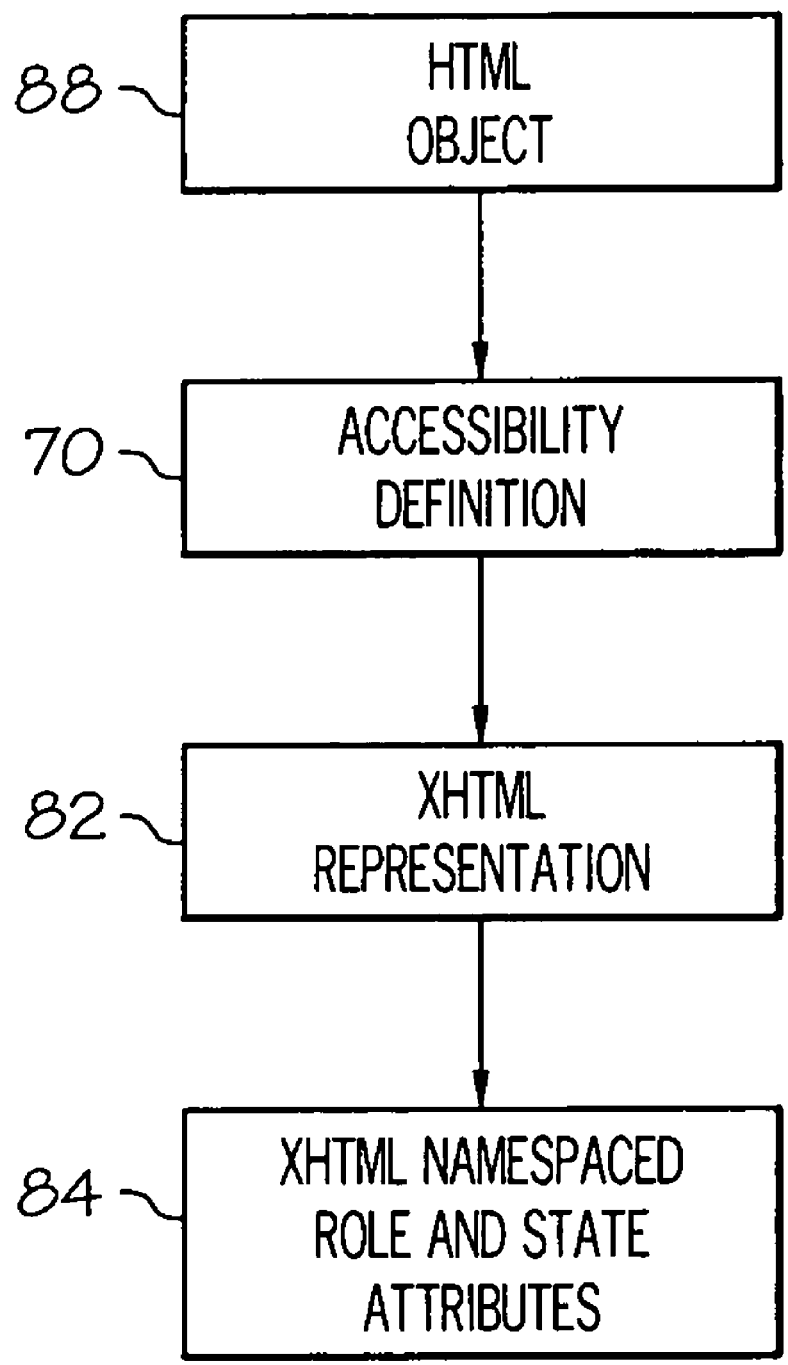
FIG. 7 is a block diagram illustrating an exemplary mapping of an accessibility definition to a corresponding XHTML attribute for an associated object.

An example of a mapping is illustrated in the block diagram shown in FIG. 7. Assume that an HTML document wants to include an object 88, such as an alert, as identified in Column 1, Row 1 of Table 1. The HTML code in the HTML document 12 may include the exemplary accessibility definition syntax as seen in the Column 2, Row 1 of Table 1:

```
<body>
<span class="accessible alert">
</span>
```

Thus, the accessibility definition 70 is embedded in a class attribute as explained more fully herein. Upon execution of a script, e.g., as flowcharted in FIG. 6, and set out in the exemplary rolestate.js pseudo-code above, the script maps the accessibility definition 70 to a corresponding XHTML representation 82. For example, <span class="accessible alert"> is mapped to the corresponding XHTML2 representation <span role="wairole:alert">. In this example, there is no state information provided. As Table 1 suggests, other exemplary objects may include both role and state information. Moreover, there may be multiple state entries, as illustrated by the accessibility definition for the slider object illustrated in Row 4 of Table 1. The XHTML representation 82 is then copied into namespaced role and state attributes 84.

That is, when the script parses the role keyword from the class attribute, the script maps the role keyword to a constant defined in the role namespace and then sets an attribute in the XHTML namespace whose value is the namespaced role. Thus, <span class="accessible alert"> becomes <span xhtml2:role="wairole:alert">. The <span> is given one new attribute, named xhtml2:role (the "role" attribute in the namespace whose prefix was defined earlier in the document as "xhtml2"). This new attribute has a value of "wairole: checkbox", again where "wairole" is the prefix defined to correspond to the role namespace.

The accessibility definitions and corresponding script library may be cross-platform compatible and may support each platform's event model, as well as the standard DOM event model supported by various web-browsers. The accessibility definitions and corresponding script library may also be compatible with both HTML and XHTML documents, served either with a "text/html" or "application/xhtml+xml" content type. Also, it may be desirable to allow the accessibility definitions and corresponding script library to utilize browser-specific optimization techniques, such as Firefox's support for client-side XPath queries, to minimize the performance impact.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of including accessible role and state information in hypertext markup language documents comprising:
    receiving a hypertext markup language document, by a user agent executing on a computing device, from a server computer across a network connection, wherein said hypertext markup language document includes:
        an accessibility definition that corresponds with an object of said hypertext markup language document, which is encoded into a hypertext markup language class attribute, said accessibility definition comprising role information and corresponding state information if applicable to said role information;
    transforming said received hypertext markup language document by said user agent, wherein said transformation is implemented by:
        constructing a document object model corresponding to said received hypertext markup document; and
        associating a script with said hypertext markup language document for:
            parsing at least a portion of said hypertext markup language document to identify said accessibility definition within said document; and
            mapping said role information and said state information of said accessibility definition to corresponding namespaced role and state attributes; and
    rendering the transformed hypertext markup language document into a presentable document that incorporates said object and said corresponding namespaced role and state attributes.

2. The method according to claim 1, further comprising encoding an accessibility header into said class attribute, said accessibility header uniquely identifying said class attribute as including said accessibility definition.

3. The method according to claim 2, further comprising:
    encoding said accessibility definition into a plurality of classes of said class attribute such that:
        said accessibility header comprises a first one of said plurality of classes;
        said role information comprises a second one of said plurality of classes; and
        said state information comprises at least one of said plurality of classes if state information is applicable to said role information, otherwise no classes are required if no state information is provided.

4. The method according to claim 1, wherein:
    said class attribute comprises a space delimited list of classes; and
    said class attribute may contain classes not related to said accessibility definition; further comprising:
    utilizing said script to extract said role information and said state information from said list of classes regardless of said classes not related to said accessibility definition.

5. The method according to claim 1, wherein:
    said namespaced role and state attributes further comprise extended hypertext markup language namespaced attributes.

6. The method according to claim 1, further comprising:
    performing at least one of:
    configuring said script to perform said parsing on the loading of said hypertext markup language document; and
    configuring said script to perform said parsing each time a new element is added subsequent to the loading of said hypertext markup language document.

7. A system for including accessible role and state information in hypertext markup language documents comprising:
    a processor;
    system memory;
    program code resident in said system memory, said program code executable by said processor to execute a user agent to receive from a server computer across a network connection, a hypertext markup language document, wherein said hypertext markup language document includes:
    a data structure in said hypertext markup language document for defining an accessibility definition that corresponds with an object of said hypertext markup language document, which is encoded into a hypertext markup language class attribute, said accessibility definition comprising role information and corresponding state information if applicable to said role information; and
    said user agent further executable by said processor to transform said received hypertext markup language document by:
        constructing a document object model corresponding to said received hypertext markup document;
        parsing at least a portion of said hypertext markup language document to identify said accessibility definition;
        mapping said role information and said state information of said accessibility definition to corresponding namespaced role and state attributes; and
        rendering the transformed hypertext markup language document into a presentable document that incorporates said object and said corresponding namespaced role and state attributes.

8. The system according to claim 7, wherein:
    said data structure is encoded in a class attribute as a list of classes defining an accessibility definition such that:
    a first one of said classes of said accessibility definition defines an accessibility header that uniquely identifies said class attribute as containing said accessibility definition;
    a second one of said classes of said accessibility definition defines said role information; and
    at least one of said classes of said accessibility definition defines said state information if state information is applicable to said role information, otherwise no classes are required if no state information is provided.

9. The system according to claim 8, wherein:
said program code resident in said system memory is further configured to implement said user agent to associate a script configured as a library of functions that is called from said hypertext markup language document.

10. The system according to claim 7, wherein:
said namespaced role and state attributes comprise extended hypertext markup language namespaced role and state attributes.

11. The system according to claim 7, wherein:
said program code resident in said system memory is further configured to implement said user agent to associate at least one of:
   a script configured to perform said parsing on the loading of said hypertext markup language document; and
   a script configured to perform said parsing each time a new element is added subsequent to the loading of said hypertext markup language document.

12. The system according to claim 7, wherein:
said program code resident in said system memory is further configured to implement said user agent to associate a script configured to convert said accessibility definition to an extended hypertext markup language representation, and to further copy said extended hypertext markup language representation to extended hypertext language namespaced role and state attributes.

13. A computer program product for including accessible role and state information in hypertext markup language documents comprising:
   a computer usable storage medium having computer usable program code embodied therewith, the computer usable medium comprising:
   computer usable program code configured implement a user agent configured to receive a hypertext markup language document from a server computer across a network connection, wherein said hypertext markup language document includes:
      an accessibility definition that corresponds with an object of said hypertext markup language document, which is encoded into a hypertext markup language class attribute, said accessibility definition comprising role information and corresponding state information if applicable to said role information;
   computer usable program code configured to transform said received hypertext markup language document including:
      computer usable program code configured to construct a document object model corresponding to said received hypertext markup document;
      computer usable program code configured to associate a script with said hypertext markup language document for:
         parsing at least a portion of said hypertext markup language document to identify said accessibility definition; and
         mapping said role information and said state information of said accessibility definition to corresponding namespaced role and state attributes; and
   computer usable program code configured to render the transformed hypertext markup language document into a presentable document that incorporates said object and said corresponding namespaced role and state attributes.

14. The computer program product according to claim 13, wherein:
said computer usable program code configured to associate a script comprises computer usable program code configured as a library of functions called from said hypertext markup language document.

15. The computer program product according to claim 13, wherein:
said computer usable program code configured to associate a script comprises computer usable program code configured as a library of functions that can be called from said hypertext markup language document to parse at least a single element or up to the entirety of said document.

16. The computer program product according to claim 13, wherein:
said computer usable program code configured to associate a script comprises computer usable program code configured to obtain said script from said received hypertext markup language document.

17. The computer program product according to claim 13, wherein:
said computer usable program code configured to associate a script comprises computer usable program code to map occurrences of said accessibility definition to corresponding extended hypertext markup language namespaced role and state attributes.

18. The computer program product according to claim 13, wherein:
said accessibility definition is encoded into said class attribute as a plurality of classes such that:
   a first one of said plurality of class of said accessibility definition defines an accessibility header that uniquely identifies said class attribute as containing said accessibility definition;
   a second one of said plurality of class of said accessibility definition defines said role information; and
   at least one of said classes of said accessibility definition defines said state information if state information is applicable to said role information, otherwise no classes are required if no state information is provided.

19. The method according to claim 1, wherein:
said accessibility definition is encoded via said class attribute into a semantically meaningless hypertext markup language element.

20. The system according to claim 7, wherein:
said computer device further comprises an accessibility architecture of a corresponding operating system and said namespaced role and state information is further mapped to said accessibility architecture.

* * * * *